United States Patent [19]
Iritani Yoshikazu et al.

[11] 3,876,763

[45] Apr. 8, 1975

[54] INFECTIOUS CORYZA INFECTIOUS BRONCHITIS AND NEWCASTLE DISEASE VACCINES AND PRODUCTION THEREOF

[75] Inventors: Iritani Yoshikazu, Kibukawa; Koichi Otsuki, Tottori, both of Japan

[73] Assignee: Shionogi & Co., Ltd., Osaka, Japan

[22] Filed: Feb. 29, 1972

[21] Appl. No.: 230,457

Related U.S. Application Data

[63] Continuation-in-part of Ser. No. 210,616, Dec. 2, 1971, abandoned.

[30] Foreign Application Priority Data

Dec. 29, 1970 Japan................................ 45-129817

[52] U.S. Cl. ................................................. 424/89
[51] Int. Cl. ........................... C12k 5/00; C12k 7/00
[58] Field of Search ......................................... 424/89

[56] References Cited
OTHER PUBLICATIONS

Vet. Bull. 32, No. 33 (1962) of Clark et al., Studies of an Inactivate of Hemophilus Gallinarum Vaccine for Immunization of Chicks against Infectious Coryza.

Vet. Bull. 34, No. 45 (1964) of Page et al., Haemophilus Infections in Chickens, Results of Laboratory and Field Trials of Formalinized Bacterias for the Prevention of Disease caused by Haemophilus Gallinarum.

Vet. Bull. 36, No. 1014, No. 2224 (1966) of Berry Inactivated Infectious Bronchitis Vaccine Duration of Antibody after Inactivated Infectious Bronchitis Vaccine.

Vet. Bull. 40, No. 3949 (1970) of Pagnini et al., Propbyloxis of Newcastle Disease with an Inactivated Vaccine in Oily Adjuvant.

*Primary Examiner*—Shep K. Rose
*Attorney, Agent, or Firm*—Wenderoth, Lind & Ponack

[57] ABSTRACT

A killed combined vaccine comprising killed *Hemophilus gallinarum*, killed infectious bronchitis virus and killed Newcastle disease virus: the said combined vaccine being prepared by mixing, in such proportions that the said vaccine contains effective amounts of each killed agent; killed *Hemophilus gallinarum*, the bacteria being grown in a natural medium then killed; killed infectious bronchitis virus; and killed Newcastle disease virus, the latter two being prepared by a conventional process using embryonated chicken eggs. The killed combined vaccine is useful for the immunization of poultry against respiratory infections caused by *Hemophilus gallinarum*, infectious bronchitis virus, and/or Newcastle disease virus.

2 Claims, No Drawings

INFECTIOUS CORYZA INFECTIOUS BRONCHITIS AND NEWCASTLE DISEASE VACCINES AND PRODUCTION THEREOF

This is a continuation-in-part of Ser. No. 210,616, filed Dec. 21, 1971, now abandoned. This invention relates to a killed combined vaccine for the immunization of poultry against respiratory infections, which comprises effective amounts—each of killed *Hemophilus gallinarum*, killed infectious bronchitis virus, and killed Newcastle disease virus. Further, it relates also to a process for producing the same.

Infectious coryza, infectious bronchitis, and Newcastle disease are important respiratory disease in poultry. The causal organism of infectious coryza is *Hemophilus gallinarum*; infectious bronchitis and Newcastle disease are caused by viruses. Poultry are seriously affected by epidemics of these diseases; natural outbreaks frequently affecting chickens, turkeys, guinea-fowls, ducks, geese, pigeons, pheasants, and partridges.

Infectious bronchitis causes high mortality in young poultry, though its effects are less severe in adult birds. Infectious coryza causes little mortality, its main effects being growth inhibition and sudden depression of egg production, causing heavy loss to the poultry farmer. Newcastle disease is the most serious of these diseases; the mortality rate is high regardless of the age of infected poultry.

Though both killed and live virus vaccines have hitherto been used for control of Newcastle disease and infectious bronchitis; they have all been in the form of a single, and not combined vaccine. Moreover, the killed vaccine for control of infectious bronchitis which is available on the market, shows only a low activity. Though live vaccines are capable of giving relatively long-lasting immunity, their use generally raises the question of safety. Normal healthy poultry are frequently killed by vaccination with live vaccines, the danger being particularly serious in birds under 3 weeks of age. In addition, the use of live vaccines sometimes results in spread of the diseases from the vaccinated poultry to susceptible or non-immune poultry. For these reasons killed vaccines are preferred.

As is well known, infections of the respiratory tract in poultry are usually encountered in the form of a so-called "respiratory disease complex" caused by more than one infectious agent, e.g., *Hemophilus gallinarum*, Newcastle disease virus and infectious bronchitis virus. Also, the economic loss to poultry farming caused by multiple infection is much more severe than that due to a single infection. Moreover, in the treatment of a large number of poultry, the time required for repeated applications of two or more single vaccines to a large number of poultry makes the vaccination very expensive. For these reasons the use of a combined vaccine is favorable to the poultry farming, especially to that on a large scale. Despite this, killed combined vaccine hs not yet been used in this field.

Although it might be expected that a combination of plural vaccines results in an unfavorable effect on poultry, it has been found that the combined vaccine of the present invention can be used quite safely, without any such adverse effect. Moreover, while a mixture of different vaccines is liable to lose the activities of the individual components through interference or mutual inhibition (Michael A. Bratt and Harry Rubin, *Virology*, 33, 598–608(1967)), it has also been found that no such incompatibility exists in the combined vaccine of the present invention.

On the other hand, the hitherto-known killed vaccines for control of infectious coryza have been prepared by growing a strain of Hemophilus gallinarum in semi-synthetic nutrient media, and their immunological activities are too low and not for practical use (Clark and Godfrey, *Avian Dis.*, 5, 37 (1961); Page et al. *Avian Dis.*, 7, 239 (1963)). According to studies of the inventors, however, it has been confirmed unexpectedly that killed vaccine prepared by growing the said microorganism in natural nutrient media instead of synthetic or semi-synthetic nutrient media shows a markedly higher immunological activity than the previously known vaccines. In addition, in spite of the face that the single killed vaccine prepared from the infectious bronchitis virus shows only a slight activity, especially in an early stage after vaccination, it has been discovered that a mixture of the said vaccine with the killed vaccine prepared from Newcastle disease virus and/or the killed vaccine prepared from *Hemophilus gallinarum* provides a markedly enhanced immunological activity against infectious bronchitis. That is, the latter two vaccines have a synergistic effect on the immunological activity of the killed infectious bronchitis vaccine.

Thus, the present invention has been accomplished on the bases of these and other discoveries, and may be clearly characterized by its significant advantages in view of the aforesaid and other technical backgrounds.

Accordingly, one of the fundamental objects of the invention is the provision of a killed combined vaccine comprising an effective amount each of killed *Hemophilus gallinarum*, killed Newcastle disease virus and killed infectious bronchitis virus; and a precess for producing the same. Another object of the invention is the provision of a killed combined vaccines comprising an effective amount each of two agents selected from the group consisting of killed *Hemophilus gallinarum*, killed Newcastle disease virus and killed infectious bronchitis virus; and a process for producing the same. Still another object of the invention is the provision of a new killed single vaccine for control of infectious coryza and a process for producing the same.

According to the present invention, the preparation of the killed vaccine for control of infectious coryza uses of natural nutrient media which are usually for cultivation of the Hemophilus bacteria. As mentioned above, it has been discovered that a killed vaccine prepared in natural nutrient media has a higher potency than that prepared in synthetic or semi-synthetic nutrient media. In addition, it has been confirmed that *Hemophilus gallinarum* strain 221 grown in a natural medium differs from that grown in a synthetic or semi-synthetic nutrient medium in its morphological characteristics. As the natural nutrient medium to be used in the present invention there may be exemplified a medium being adjusted to pH 7.0 to 7.4 and essentially consisting of 1,000 ml of poultry meat bouillon, 5 g of sodium chloride, 10 g of polypeptone and 0.5 percent of poultry serum. Although the composition of the nutrient medium may include a very wide range of natural nutrients, it is particularly desired and intended to include the uses of beef meat extract or potato in place of the poultry meat bouillon, casamino acid or yeast extract in place of the polypeptone, and sheep serum or diphosphopyridine nucleotides in place of the poultry serum. An embryonated egg may also be used as the natural nutrient medium.

A typical strain of Hemophilus gallinarum, i.e., strain 221, has been deposited with the National Institute of Animal Health, the Ministry of Agricultural and Forestry (hereinafter referred to as NIAH), joining to the Japanese Federation of Culture Collections of Microorganisms, and a subculture thereof may be obtainable therefrom at any time. It should be noted that the bacteria to be used in the present invention is not to be limited to the above-referred specific strain, and other known strains of *Hemophilus gallinarum* may also be used for the production of the objective vaccines.

*Hemophilus gallinarum* may be inoculated into a natural nutrient medium and then grown at a conventional temperature (e.g., 30°–40°C) by large scale standing culture. The cultivation may also be effected under submerged aerobic conditions. After cultivation to an intended stage, an inactivating agent is added to the culture broth in order to inactivate the microorganism. As the inactivating agent, there may be exemplified thimerosal, β-propiolactone, tylosin, salicylic acid, crystal violet, benzoic acid, surface active agents such as benzethonium chloride, polymyxin, and gramicidin. After addition of an appropriate amount of an adjuvant, the broth is centrifuged in a continuous centrifuge. As the adjuvant, there may be used aluminum hydroxide gel, aluminum phosphate gel, calcium phosphate gel, or alum. The precipitate harvested by centrifugation is resuspended in a sterile phosphate buffer-saline solution so as to make the cell concentration $10^6$–$10^8$ cells/ml, and then an antiseptic agent is added to the suspension for storage. As the antiseptic agent there may be used thimerosal, tylosin, β-propionlactone, benzoic acid, formalin, salicylic acid, crystal violet, surface active agents such as benzethonium chloride, polymyxin, or gramicidin. The thus prepared killed infectious coryza vaccine is hereinafter referred to as Hg vaccine.

Productions of the killed Newcastle disease vaccine and the killed infectious bronchitis vaccine may be performed by conventional methods, e.g., propagating the desired virus in a embryonated chicken egg, collecting the propagated virus, inactivating the virus, suspending the virus in a suitable buffer solution, and finally adding a suitable adjuvant to the suspension.

A typical Newcastle disease virus employed for preparation of the killed Newcastle disease vaccine is Sato strain Newcastle disease virus. Sato strain Newcastle disease virus has been deposited with the NIAH. If desired, Miyadera strain Newcastle desease virus may also be used instead of Sato strain though Newcastle disease virus to be used in the present invention is not limited to these two strains. The thus prepared killed Newcastle disease vaccine is hereinafter referred to as ND vaccine.

A typical infectious bronchitis virus employed for preparation of the killed infectious bronchitis vaccine is Beaudette 42 strain infectious bronchitis virus, which has also been deposited with NIAH, but the virus to be used in the present invention is not limited to this strain. For example, Massachusetts or Connecticut type strain of infectious bronchitis virus may be use instead of Beaudette 42 strain. The Beaudette 42 strain is very similar to the Massachusetts type strain of infectious bronchitis virus, so the killed virus vaccine produced by the Beaudette 42 strain is also effective immunologically against the Massachusetts and Connecticut type strains of infectious bronchitis. The thus prepared killed infectious bronchitis vaccine is hereinafter referred to as IB vaccine.

For the preparation of combined vaccines, two or three agents out of killed *Hemophilus gallinarum*, killed Newcastle disease virus and killed infectious bronchitis virus are mixed together in such proportions that each agent is contained at an effective concentration in the final product. For example, a preferred proportion may be 5 to 30 volumes of the killed *Hemophilus gallinarum* strain 221 suspension of a concentration of $3.3 \times 10^7$–$3.3 \times 10^9$ cells/ml, 5 to 30 volumes of the killed Beaudette 42 strain infectious bronchitis virus suspension at a concentration of $10^4$–$10^7$ $EID_{50}$/ml, and 5 to 30 volumes of the killed Sato strain Newcastle disease virus suspension of a concentration of $10^{6.5}$–$10^{9.5}$ $EID_{50}$/ml per 100 volumes of the mixed vaccine product, though the above is not essential.

Though the killed vaccines thus prepared show in most cases a sufficient immunological activity without any adjuvant, it is preferred to add an adjuvant to the vaccine preparations to enhance their potency. A preferred ratio of the adjuvant may be 1 to 50 volumes per 100 volumes of the killed combined vaccine, though this is not essential. As the adjuvant for this purpose, there may be used aluminum hydroxide gel, aluminum phosphate gel, calcium phosphate gel, or alum. If necessary, an antisecptic agent such as thimerosal, β-propiolactone, tylosin, salicylic acid, crystal violet, benzoic acid, surface active agents such as benzethonium chloride, polymyxin, or gramicidin may be supplied.

The killed vaccines of the present invention may be administered to poultry by intramuscular, subcutaneous, or intracutaneous injection.

The killed combined vaccine of the present invention have excellent immunological activity, and an immunization against to all of the three diseases, i.e., infectious coryza, infectious bronchitis and Newcastle disease, can be effected by a single administration. Further, there is no significant sideeffect in poultry which are given a vaccine of the present invention. Thus, the vaccines of the present invention are advantageously used for immunization of poultry against the respiratory infections, and the advantages provided by the present invention may be highly appreciated in the field of the poultry farming, especially that on a large scale.

Presently preferred and practice embodiments of the present invention are illustratively shown in the following examples, and the test data which follow will serve to make it clear that the products of the present invention have excellent activities.

EXAMPLE 1

The medium described below is used for producing a killed Hg vaccine.

| Medium: | Chicken meat bouillon* | 1,000 ml |
|---|---|---|
| | Sodium chloride | 5 g |
| | Polypeptone | 10 g |
| | Chicken serum | 0.5 % |
| | pH 7.0–7.4 | |

*To 1 kg of minced chicken meat is added 2 liter of water with stirring. The mixture is allowed to stand at 0°C for about 24 hrs., steamed for 30–60 mins., and filtered. The filtrate is used as the chicken meat bouillon.

A chicken meat medium consisting of the chicken meat bouillon, sodium chloride and polypeptone is sterilized at 121°C for 20 mins. in an autoclave. Chicken serum is sterilized separately with a Seitz filter. The sterile chicken serum is added to the sterile chicken meat medium.

Hemophilus gallinarum strain 221 obtained from a freeze-dried stock sample is inoculated into the Yolk Sac of a 4-day old embryonated chicken egg at an inoculum size of approximately $10^6$ viable cells/ml. After incubation for about 24 hrs., death of the embryo is confirmed, the yolk of the egg is smeared onto a Blood agar medium, and Hemophilus gallinarum strain 221 is grown at 37°C for 24 hrs., in an atmosphere containing 5–10 % $CO_2$. The cells obtained from a colony on the Blood agar medium are inoculated into 1 liter of the above-mentioned sterilized chicken medium placed in a 2-liter flask at an inoculum size of $10^4$–$10^5$ viable cells/ml and grown at 37°C by a static culture till a stationary phase with a concentration of $10^6$–$10^8$ cells/ml is attained. The culture is then inactivated by adding 0.1 % of thimerosal, and allowing the broth to stand at 4°C for about 24 hrs.. Aluminum hydroxide gel prepared by the method described below is added to the inactivated culture at a ratio of about one volume per 50 volumes of culture broth. The mixture is allowed to stand for about 5 mins. at room temperature, then subjected to continuous centrifugation at 6,000–12000 r.p.m. with an outflow rate of 100 ml/min.. To the precipitate harvested by the centrifugation is added a sterile phosphate buffer-saline solution (pH 7.2–7.5) to give a suspension of about 33 times the concentration of the original culture broth. Tylosin is added as an antiseptic to the suspension to make the final concentration of 5 %.

Preparation of aluminum hydroxide gel:
  A slight excess of 1 % aqueous solution of ammonium aluminum sulfate is reacted with 1 % aqueous ammonia, and the supernatant fluid is removed by decantation. The precipitate is washed repeatedly with water until ammonium ion disappears from the washing. The precipitate is sterilized at 120°C for 30 mins. in an autoclave to obtain aluminum hydroxide gel to be used as adjuvant.

Preparation of 15 % Hg vaccine:
  Sterile phosphate buffer-saline solution(pH 7.2–7.5) and aluminum hydroxide gel are mixed with 15 volumes of the aforesaid 33 times-concentrated suspension to make 100 volumes of final product containing 50 volumes of the aluminum hydroxide gel.

EXAMPLE 2

About $10^5$ cells of Sato strain Newcastle disease virus are inoculated into the allantoic cavity of a 9 to 11-day old embryonated chicken egg and propagated for 26–36 hrs. at 37°C in an incubator. The allantoic fluid is taken from the embryonated egg and to it is added β-propiolactone as an inactivating agent, to give a final concentration 0.05 %. The fluid is then allowed to stand at 4°C for 36–60 mins.. The fluid is centrifuged at 3,000 r.p.m. for about 30 mins. to remove any precipitated residue.

Preparation 15 % ND vaccine:
  To 15 volumes of the thus obtained supernatant fluid, which contains $10^{6.5}$–$10^{9.5}$ EID$_{50}$/ml of Sato strain Newcastle disease virus, is added 50 volumes of the aluminum hydroxide gel described in Example 1. The mixture is then diluted to 100 volumes with sterile phosphate buffer-saline solution(pH 7.2–7.5).

EXAMPLE 3

A killed IB vaccine is prepared according to the manner described in Example 2 except the Beaudette 42 strain infectious bronchitis virus is employed in place of Sato strain Newcastle disease virus.

Preparation of 15 % IB vaccine:
  To 15 volumes of the obtained supernatant fluid, which contains $10^4$–$10^7$ EID$_{50}$/ml of Beaudette 42 strain, is added 50 volumes of the aluminum hydroxide described in Example 1. The mixture is then diluted to 100 volumes with sterile phosphate beffer-saline solution (pH 7.2–7.5).

EXAMPLE 4

Preparation of a killed combined vaccine comprising 15 % ND vaccine and 15 % IB vaccine:
  To a mixture of 15 volumes of the supernatant fluid containing $10^{6.5}$–$10^{9.5}$ EID$_{50}$/ml of Sato strain Newcastle disease virus described in Example 2 and 15 volumes of the supernatant fluid containing $10^4$–$10^7$ EID$_{50}$/ml of Beaudette 42 strain described in Example 3 is added 50 volumes of the aluminum hydroxide described in Example 1. The mixture is then diluted to 100 volumes with sterile phosphate buffer-saline solution (pH 7.2–7.5).

EXAMPLE 5

Preparation of killed combined vaccine comprising 15% IB vaccine and 15 % Hg vaccine:
  To a mixture of 15 volumes of the supernatant fluid containing 44–$10^7$ EID$_{50}$/ml of Beaudette 42 strain described in Example 3 and 15 volumes of the 33 times-concentrated suspension described in Example 1 are added the aluminum hydroxide gel described in Example 1 and sterile phosphate beffer-saline solution (pH 7.2–7.5) to make 100 volumes of final containing 50 volumes of aluminum hydroxide gel.

EXAMPLE 6

Preparation of a killed combined vaccine comprising 15 % ND vaccine and 15 % Hg vaccine:
  To a mixture of 15 volumes of the supernatant fluid containing $10^{6.5}$–$10^{9.5}$ EID$_{50}$/ml of Sato strain Newcastle disease virus described in Example 2 and 15 volumes of the 33 times-concentrated suspension described in Example 1 are added the aluminum hydroxide gel described in Example 1 and the sterile phosphate buffer-saline solution (pH 7.2–7.5) to make 100 volumes of final product containing 50 volumes of aluminum hydroxide gel.

EXAMPLE 7

Preparation of a killed combined vaccine comprising 15 % ND vaccine, 15 % IB vaccine and 15 % Hg vaccine:
  To a mixture of 15 volumes of the supernatant fluid containing $10^{6.5}$–$10^{9.5}$ EID$_{50}$/ml of Sato strain Newcastle disease virus described in Example 2, 15 volumes of the supernatant fluid containing $10^4$–$10^7$ EID$_{50}$/ml of Beaudette 42 strain described in Example 3, and 15 volumes of the 33 times-concentrated suspension described in Example 1 are added the aluminum hydroxide gel described in Example 1 and sterile phosphate buffer-saline solution (pH 7.2-7.5) to make 100 volumes of final product containing 50 volumes of aluminum hydroxide gel.

EXAMPLE 8

Preparation of a killed combined vaccine comprising 15 % ND vaccine, 15 % IB vaccine, and 15 % Hg vaccine:

To a mixture of 15 volumes of the supernatant fluid containing $10^{6.5}$–$10^{9.5}$ $EID_{50}$/ml of Sato strain Newcastle disease virus described in Example 2, 15 volumes of the supernatant fluid containing $10^4$–$10^7$ $EID_{50}$/ml of Beaudette 42 strain described in Example 3, and 15 volumes of a 33 times-concentrated suspension of Hemophilus gallinarum strain 221, prepared in the same manner as described in Example 1 except that the calcium phosphate gel described below is employed instead of aluminum hydroxide gel, are added calcium phosphate gel and sterile phosphate buffer-saline solution (pH 7.2-7.5) to make 100 volumes of product containing 50 volumes of calcium phosphate gel.

Preparation of a calcium phosphate gel:

To 10 liters of an aqueous solution containing 1/10 M of calcium chloride is added 10 liters of an aqueous solution containing 1/10 M of sodium hydrogen phosphate and 1/10 M of ammonium hydroxide, and the supernatant fluid is removed by decantation. The precipitate is washed repeatedly with water until ammonium ion disappears from the aqueous washing. The precipitate is sterilized at 120°C for 30 mins. in an autoclave and used as the calcium phosphate gel.

EXAMPLE 9

Preparation of a killed combined vaccine comprising 15 % ND vaccine, 15 % IB vaccine, and 15 % Hg vaccine:

To a solution of 15 volumes of the supernatant fluid containing $10^{6.5}$–$10^{9.5}$ $EID_{50}$/ml of Sato strain Newcastle disease virus described in Example 2, 15 volumes of the supernatant fluid containing $10^4$–$10^7$ $EID_{50}$/ml of Beaudette 42 strain described in Example 3, and 15 volumes of a 33 times-concentrated suspension of Hemophilus gallinarum strain 221 prepared in the same manner as described in Example 1 except that the aluminum phosphate gel described below is employed instead of aluminum hydroxide gel, are added aluminum phosphate gel and sterile phosphate beffer-saline solution(pH 7.2-7.5) to make 100 volumes of final product containing 50 volumes of aluminum phosphate gel.

Preparation of aluminum phosphate gel:

To 1 % aqueous solution of sodium hydrogen phosphate is added 1 % aqueous solution of aluminum chloride at room temperature with stirring, and the supernatant fluid is removed by decantation. The precipitate is washed with water repeatedly until chloride ion disappears from the aqueous washing. The precipitate is sterilized at 120°C for 30 mins. in an autoclave, and used as the aluminum phosphate gel.

Test 1

Male Forsgate chickens of 4 weeks age were injected intramuscularly with 0.5 ml of single or combined killed vaccine produced by the procedure described in Example 1, 2, 3, 6 or 7. Groups of the immunizing and non-immunized chicken were challenged 2 weeks later by dropping of Hemophilus gallinarum strain 221 into the nasal cavity. Symptoms of nasal discharge, facial swelling and sneezing were observed daily for seven consecutive days after the challenge, and body-weight gain was measured for 6 days. The results are shown in Table 1. The chicken immunized with 15 % Hg vaccine or with combined vaccine comprising 15 % Hg vaccine, 15 % ND vaccine, and 15 % IB vaccine showed no symptom of infectious coryza. Non-immunized chickens and those immunized by 15 % ND vaccine or 15 % IB vaccine showed symptoms of infectious coryza and decreased body-weight gain.

Table 1

| Group | Vaccine | Number of chickens | Symptons of infectious coryza after challenge (%) | | | | | | | Gain in body weight over 6 days (g/chicken) |
|---|---|---|---|---|---|---|---|---|---|---|
| | | | 1 | 2 | 3 | 4 | 5 | 6 | 7 (day) | |
| Challenged | none | 6 | 100 | 100 | 100 | 100 | 100 | 100 | 100 | 31.6 |
| " | 15% Hg | 5 | 0 | 0 | 0 | 0 | 0 | 0 | 0 | 67.0 |
| " | 15% ND | 5 | 100 | 100 | 100 | 100 | 100 | 100 | 100 | 4.0 |
| " | 15% IB | 5 | 100 | 100 | 100 | 100 | 100 | 100 | 100 | 33.0 |
| " | 15% Hg + 15% ND | 5 | 0 | 0 | 0 | 0 | 0 | 0 | 0 | 89.0 |
| " | 15% Hg + 15% ND + 15% IB | 5 | 0 | 0 | 0 | 0 | 0 | 0 | 0 | 123.0 |
| not challenged (Control) | none | 6 | 0 | 0 | 0 | 0 | 0 | 0 | 0 | 90.0 |

Test 2

Male Forsgate chickens of 4 weeks of age were injected intramuscularly with 0.5 ml of combined vaccine produced by the procedure described in Example 9. The potency of the combined vaccine was determined by the methods described below:

1. Challenge test: Two weeks after vaccination, immunized and non-immunized chickens were challenged by dropping Hemophilus gallinarum strain 221 at a concentration of $5 \times 10^7$ cells/ml into the nasal cavity or injecting Sato strain Newcastle disease virus at a concentration of 1,000 Minimum Lethal Dose into the muscle. Symptoms of nasal discharge and facial swelling were observed daily for 10 consecutive days after the challenge. The number of chickens surviving 10 days after the challenge was noted.

2. Hemagglutination-inhibition(HI) test: Serum was taken from the chicken two weeks after vaccination and serially diluted twofold, beginning with 1:5, using plastic plates. This diluted serum(0.2 ml) was added to 0.2 ml of an antigen containing 4 HA units of Ishii strain Newcastle disease virus(NDV). The mixture was allowed to stand for 10 min. at room temperature, and then 0.4 ml of 0.5 % chicken red block cells was added. The maximum dilution rate of the serum at which hemagglutination is completely inhibited was determined. This dilution rate represents the HI titer to NDV. (Kawashima et al.; Report of Gove. Exp. Sta. Anim. Hyg., 29 19 (1955))

3. Virus neutralization: Two weeks after vaccination, 0.2 ml of serum was taken from a chicken and shaken with 0.2 ml of a suitable dilution of Beaudette 42 strain infectious bronchitis virus(IBV). The mixture was incubated at 0–4°C in a refrigerator overnight. Thereafter, 0.1 ml of the mixture was inoculated into the allantoic cavity of 11-day old embryonated eggs. After incubation for 1 week, the embryonated chicken eggs were examined for appearance of infection. The 50 percent end point of embryo mortality was determined in each series by the method of Behrens-Karber (Karber, D.; Arch. Exp. Path. Pharm. 162 480 (1931)). The difference between the mortality end point of the virus titration and that of the serum-virus mixture titration represents the neutralization capacity of the serum. For example, if the mortality endpoint of the virus titration is in the $10^{-6}$ dilution and that of the serum-virus mixture is in the $10^{-4}$ dilution, then the neutralization titer of the serum is represented as 2.00 neutralizing doses in 0.05 ml of serum. (H. E. Biester, L. H. Schwarte: Diseases of Poultry, p. 605 – 619, Fifth Edition, 1965) The results are shown in Table 2. It is clear from Table 2 that the chicken which had been immunized by the killed combined vaccine consisting of 15 % Hg vaccine, 15 % ND vaccine and 15 % IB vaccine were protected against infectious coryza, Newcastle disease and infectious bronchitis.

Table 2

| Group | Chicken number | | Symptoms of infectious coryza after infection by Hemophilus gallinarum | | | | | | | | | | Weight gain over 10 days (g) | HI titer to NDV | Challenge* test by Newcastle disease virus | Neutralization titer to IBV |
|---|---|---|---|---|---|---|---|---|---|---|---|---|---|---|---|---|
| | | | 1 | 2 | 3 | 4 | 5 | 6 | 7 | 8 | 9 | 10 (day) | | | | |
| Control | 1 | F | – | – | – | + | + | + | + | – | – | – | 115.0 | <5 | D | |
| | | S | ++ | +++ | +++ | +++ | +++ | +++ | +++ | +++ | +++ | +++ | | | | |
| | 2 | F | – | – | – | – | – | + | – | – | – | – | 90.0 | <5 | D | |
| | | S | +++ | +++ | +++ | +++ | +++ | +++ | +++ | +++ | +++ | +++ | | | | |
| | 3 | F | – | – | – | – | – | – | + | – | – | – | 85.0 | <5 | D | |
| | | S | +++ | +++ | +++ | +++ | +++ | +++ | +++ | +++ | +++ | ++ | | | | |
| | 4 | F | – | – | – | – | – | – | – | – | – | – | 35.0 | <5 | D | |
| | | S | +++ | +++ | +++ | +++ | +++ | +++ | +++ | +++ | +++ | +++ | | | | |
| | 5 | F | – | – | – | – | – | – | – | – | – | – | 65.0 | <5 | D | |
| | | S | +++ | ++ | +++ | +++ | +++ | ++ | ++ | ++ | +++ | +++ | | | | |
| Avarage | | | | | | | | | | | | | 78.0 | <5 | 0/5** | –0.10 |
| Vaccinated | 6 | F | – | – | – | – | – | – | – | – | – | – | 80.0 | 40 | S | |
| | | S | – | – | – | – | – | – | – | – | – | – | | | | |
| | 7 | F | – | – | – | – | – | – | – | – | – | – | 145.0 | 80 | S | |
| | | S | – | – | – | – | – | – | – | – | – | – | | | | |
| | 8 | F | – | – | – | – | – | – | – | – | – | – | 120.0 | 10 | S | |
| | | S | – | – | – | – | – | – | – | – | – | – | | | | |
| | 9 | F | – | – | – | – | – | – | – | – | – | – | 115.0 | 40 | S | |
| | | S | – | – | – | – | – | – | – | – | – | – | | | | |
| | 10 | F | – | – | – | – | – | – | – | – | – | – | 140.0 | 40 | S | |
| | | S | – | – | – | – | – | – | – | – | – | – | | | | |
| Avarage | | | | | | | | | | | | | 120.0 | 38 | 5/5** | 2.20 |

Indications of symptom of infectious coryza:
F — facial swelling. S — nasal discharge.
The severity of symptoms is roughly indicated by the number of + signs.
— : no appearance of symptoms
++ : moderately severe
+++ : very severe
*D: Dead, S: Survivor
**Survivors/numbers of test chickens Test 3

The effects of single and combined killed vaccines on infectious bronchitis and Newcastle disease were examined according to the methods described in Test 2. The results are shown in Tables 3 and 4. It was observed that chickens immunized by injection of 15 % IB vaccine alone hardly produced an antibody to infectious bronchitis virus 2 weeks after vaccination, but chickens immunized by the killed combined vaccine consisting of 15 % IB vaccine and 15 % ND vaccine, or 15 % IB vaccine, 15 % ND vaccine and 15 % Hg vaccine fully produced an antibody to infectious bronchitis virus. Therefore, it is apparent from Tables 3 and 4 that the activity of IB vaccine was markedly enhanced by concomitant administration with ND vaccine.

Table 3

| Vaccine | Chicken number | Body weight (g) | HI titer to NDV | Challenge* test by Newcastle disease virus | Neutralization titer to IBV |
|---|---|---|---|---|---|
| | 1 | 234 | <5 | | |
| | 2 | 172 | <5 | | |

Table 3-Continued

| Vaccine | Chicken number | Body weight (g) | HI titer to NDV | Challenge* test by Newcastle disease virus | Neutralization titer to IBV |
|---|---|---|---|---|---|
| Control | 3 | 219 | <5 | 0/6 | −0.80 |
| | 4 | 220 | <5 | | |
| | 5 | 190 | <5 | | |
| | 6 | 204 | <5 | | |
| | 7 | 178 | <5 | | |
| | 8 | 160 | <5 | 0/5 | 0.20 |
| 15% Hg | 9 | 166 | <5 | | |
| | 10 | 160 | <5 | | |
| | 11 | 160 | <5 | | |
| | 12 | 184 | 10 | | |
| | 13 | 182 | <5 | | |
| 15% ND | 14 | 186 | 10 | 5/5 | 0.00 |
| | 15 | 202 | 20 | | |
| | 16 | 218 | 5 | | |
| | 17 | 188 | <5 | | |
| | 18 | 194 | <5 | | |
| 15% IB | 19 | 172 | <5 | 0/5 | 0.00 |
| | 20 | 178 | <5 | | |
| | 21 | 200 | <5 | | |
| | 22 | 178 | 20 | | |
| 15% Hg | 23 | 216 | 10 | | |
| + | 24 | 240 | 40 | 5/5 | 0.20 |
| 15% ND | 25 | 210 | 5 | | |
| | 26 | 200 | 5 | | |
| | 27 | 186 | <5 | | |
| 15% Hg | 28 | 218 | <5 | | |
| + | 29 | 150 | <5 | 0/5 | 0.00 |
| 15% IB | 30 | 196 | <5 | | |
| | 31 | 192 | <5 | | |
| | 32 | 220 | 40 | | |
| 15% IB | 33 | 234 | 10 | | |
| + | 34 | 190 | 5 | 5/5 | 2.20 |
| 15% ND | 35 | 180 | 10 | | |
| | 36 | 200 | 20 | | |
| 15% Hg | 37 | 178 | 40 | | |
| + | 38 | 216 | 10 | | |
| 15% IB | 39 | 188 | 5 | 5/5 | 2.50 |
| + | 40 | 194 | <5 | | |
| 15% ND | 41 | 132 | 10 | | |

*Surivivors/numbers of test chicken The killed vaccines employed in the test were prepared by the procedures described in Examples 1, 2, 3, 4, 5, 6 and 7.

Test 4

The effects of 15 % IB vaccine, 15 % Hg vaccine and the combined vaccine consisting of 15 % IB vaccine and 15 % Hg vaccine on infectious bronchitis were examined according to the method described in Test 2. HI test for infectious coryza was conducted by the method described in Test 2 except that Hemophilus gallinarum strain 221 was used instead of Ishii strain Newcastle disease virus. The results are shown in Table 5. It was observed that the activity of IB vaccine was enchanced by concomitant administration with Hg vaccine.

Although we have illustrated out invention in chickens, it will be apparent to those skilled in the verterinary arts that the killed single and combined vaccines of the invention is likewise applicable to other species of domesticated fowl. It should also be understood that while we have described the invention in accordance with our prefered embodiments, many equivalent variations and modifications may be resorted to without departing from the scope of the following claims.

Table 4

| Vaccine | Chicken number | HI titer to NDV | Challenge test by Newcastle disease virus | Neutralization titer to IBV |
|---|---|---|---|---|
| | 1 | <5 | | |

Table 4-Continued

| Vaccine | Chicken number | HI titer to NDV | Challenge test by Newcastle disease virus | Neutralization titer to IBV |
|---|---|---|---|---|
| | 2 | <5 | | |
| Control | 3 | <5 | 0/5 | 0.00 |
| | 4 | <5 | | |
| | 5 | <5 | | |
| | 6 | 80 | | |
| Marketing killed ND Vaccine** | 7 | 80 | | |
| | 8 | 40 | 5/5 | 0.30 |
| | 9 | 40 | | |
| | 10 | 80 | | |
| | 11 | 80 | | |
| | 12 | 80 | | |
| 15% ND | 13 | 20 | 5/5 | 0.70 |
| | 14 | 10 | | |
| | 15 | 5 | | |
| | 16 | <5 | | |
| | 17 | <5 | | |
| 15% IB | 18 | <5 | 0/5 | 0.00 |
| | 19 | <5 | | |
| | 20 | <5 | | |
| | 21 | <5 | | |
| | 22 | <5 | | |
| 30% IB | 23 | <5 | 0/5 | −0.30 |
| | 24 | <5 | | |
| | 25 | <5 | | |
| | 26 | 5 | | |
| 15% ND | 27 | 160 | | |
| + | 28 | 40 | 5/5 | 1.50 |
| 3.75% IB | 29 | 10 | | |
| | 30 | 20 | | |
| | 31 | 40 | | |
| 15% ND | 32 | 20 | | |
| + | 33 | 20 | 5/5 | 1.80 |
| 7.5% IB | 34 | 80 | | |
| | 35 | 40 | | |
| | 36 | 40 | | |
| 15% ND | 37 | 20 | | |
| + | 38 | 40 | 5/5 | 2.00 |
| 15% IB | 39 | 40 | | |
| | 40 | 80 | | |
| | 41 | 5 | | |
| 15% ND | 42 | 10 | | |
| + | 43 | 10 | 5/5 | 2.00 |
| 30% IB | 44 | 80 | | |
| | 45 | 80 | | |
| | 46 | 40 | | |
| 15% ND | 47 | 80 | | |
| + | 48 | 80 | 5/5 | 2.20 |
| 45% IB | 49 | 80 | | |
| | 50 | 80 | | |
| | 51 | 80 | | |
| 10% ND | 52 | 5 | | |
| + | 53 | 5 | 5/5 | 2.80 |
| 40% IB | 54 | 20 | | |
| | 55 | 40 | | |

*Survivors/numbers test chicken
**Product of Chemo-sero-Therapeutic Research Institute, Kumamoto, Japan. The killed vaccines employed in the test were prepared by the procedures described in Examples 2,3 and 4 except that the aluminum phosphate gel was used instead of the aluminum hydroxide gel. X % of vaccines means that X-volumes of the supernatant fluid containing $10^{6.5}-10^{9.5}$ $EID_{50}$/ml of Sato strain Newcastle disease virus or $10^4-10^7$ $EID_{50}$/ml of Beaudette 42 strain infectious bronchitis virus were contained in 100 volumes of the vaccine solution.

Table 5

| Vaccine | Neutralization titer to IBV | | | | HI titer to Hemophilus gallinarum | | | |
|---|---|---|---|---|---|---|---|---|
| | Weeks after vaccination | | | | | | | |
| | 0 | 3 | 5 | 9 | 0 | 3 | 5 | 9 |
| None | 0 | 0 | 0 | 0 | <5 | <5 | <5 | <5 |
| 15% IB | 0 | 1.2 | 1.0 | 1.7 | <5 | <5 | <5 | <5 |
| 15% Hg | 0 | 0 | 0 | 0 | <5 | 80 | 80 | 20 |
| 15% IB + 15% Hg | 0 | 1.2 | 2.0 | 2.2 | <5 | 80 | 80 | 30 |

The killed vaccines employed in the test were prepared by the procedures described in Examples 1,3 and 5 except that aluminum phosphate gel was used instead of aluminum hydroxide gel.

What is claimed is:

1. A killed combined vaccine for poultry use which comprises an effective amount of (1) killed *Hemophilus gallinarum* which is prepared by cultivating a strain of *Hemophilus gallinarum* in a natural nutrient medium, inactivating the bacteria and harvesting the inactivated bacteria, (2) killed infectious bronchitis virus and (3) killed Newcastle disease virus and (4) an adjuvant selected from the group consisting of aluminum hydroxide gel, aluminum phosphate gel, calcium phosphate gel and alum.

2. A vaccine according to claim 1 wherein the killed *Hemophilus gallinarum* is strain 221, the killed infectious bronchitis virus is selected from the group consisting of Beaudette 42, strain, Massachusettes type strain and Connecticut type strain and the killed Newcastle disease virus is selected from the group consisting of Sato strain and Miyadera strain.

* * * * *

UNITED STATES PATENT OFFICE
CERTIFICATE OF CORRECTION

Patent No. 3,876,763            Dated April 8, 1975

Inventor(s) Yoshikazu Iritani and Koichi Otsuki

It is certified that error appears in the above-identified patent and that said Letters Patent are hereby corrected as shown below:

Item 19 and Item 75, change the name of the first inventor to -- Yoshikazu Iritani --.

Signed and sealed this 1st day of July 1975.

(SEAL)
Attest:

RUTH C. MASON
Attesting Officer

C. MARSHALL DANN
Commissioner of Patents
and Trademarks